US00RE48069E

(19) United States
(12) Reissued Patent
Trapp et al.

(10) Patent Number: US RE48,069 E
(45) Date of Reissued Patent: Jun. 30, 2020

(54) FIRE-FIGHTING MONITOR WITH REMOTE CONTROL

(71) Applicant: Elkhart Brass Manufacturing Company, Inc., Elkhart, IN (US)

(72) Inventors: James M. Trapp, Galien, MI (US); Raymond A. Boissonneault, Upton, MA (US); Tina M. Mott, Osceola, IN (US)

(73) Assignee: ELKHART BRASS MANUFACTURING COMPANY, LLC, Elkhart, IN (US)

(21) Appl. No.: 15/147,643

(22) Filed: May 5, 2016

Related U.S. Patent Documents

Reissue of:
(64) Patent No.: 8,714,466
Issued: May 6, 2014
Appl. No.: 13/739,695
Filed: Jan. 11, 2013

U.S. Applications:
(63) Continuation of application No. 12/474,227, filed on May 28, 2009, now abandoned, which is a
(Continued)

(51) Int. Cl.
*A62C 31/24* (2006.01)
*A62C 37/00* (2006.01)
(Continued)

(52) U.S. Cl.
CPC ..... *A62C 31/005* (2013.01); *A62C 31/24* (2013.01); *A62C 37/00* (2013.01); *B05B 3/02* (2013.01); *B05B 3/025* (2013.01); *B05B 3/14* (2013.01)

(58) Field of Classification Search
CPC ..... A62C 31/24; A62C 31/02; A62C 31/005; A62C 37/00; B05B 15/066; B05B 15/067;
(Continued)

(56) References Cited

U.S. PATENT DOCUMENTS 936,496 A 10/1909 Vinette
1,880,272 A 10/1932 Panther, Jr.
(Continued)

FOREIGN PATENT DOCUMENTS

DE 1425515 12/1969
DE 1952689 5/1971
(Continued)

OTHER PUBLICATIONS

Menchini et al. The Development and Design of a Prototype Ultra High Pressure P-19 Firefighting Vehicle, obtained at <http://www.dtic.mil/get-tr-doc/pdf?AD=ADA467084>. Dated Feb. 3, 2007. Relevant pages include p. ii, 24-34 and 36-38.
(Continued)

*Primary Examiner* — Peter C English
(74) *Attorney, Agent, or Firm* — Taft Stettinius & Hollister LLP; Derek B. Lavender

(57) ABSTRACT

A high pressure monitor includes an outlet body with a transverse passage, which extends through the body to form two inlets of the outlet body, and a second passage, which is in communication with the transverse passage and extends through the outlet body to form an outlet. The monitor further includes first and second bodies, with the outlet body mounted between the first and second bodies. Each of the first and second bodies has a transverse passage, which are in fluid communication with the inlets of the outlet body. A first swivel joint is provided between the outlet body and the first body. A second swivel joint is provided between the outlet body and the second body. Further, each of the swivel joints comprises a pressure balanced hydraulic fitting with seals and bearings, wherein the seals and bearings are oriented to reduce the axial pressure on the bearings from fluid flowing through the monitor.

23 Claims, 8 Drawing Sheets

AMENDED

Related U.S. Application Data continuation of application No. 11/519,627, filed on Sep. 12, 2006, now abandoned, which is a continuation-in-part of application No. 10/984,047, filed on Nov. 9, 2004, now Pat. No. 7,191,964, and a continuation-in-part of application No. 11/270,952, filed on Nov. 11, 2005, now Pat. No. 7,243,864, said application No. 10/984,047 is a continuation-in-part of application No. 10/405,372, filed on Apr. 2, 2003, now Pat. No. 6,994,282, said application No. 11/270,952 is a continuation of application No. 10/405,372, filed on Apr. 2, 2003, now Pat. No. 6,994,282.

(51) Int. Cl.
*B05B 3/02* (2006.01)
*B05B 3/14* (2006.01)
*A62C 31/00* (2006.01)

(58) Field of Classification Search
CPC .. B05B 15/08; B05B 3/14; B05B 3/02; B05B 3/025; B05B 3/12
See application file for complete search history.

(56) References Cited

U.S. PATENT DOCUMENTS 2,360,397 A 10/1944 Carpenter
2,698,664 A * 1/1955 Freeman ..... A62C 31/24 169/25
2,729,295 A 1/1956 Edwards ..... A62C 31/24 169/25
2,729,296 A * 1/1956 Gurney ..... 169/25
2,834,416 A 5/1958 Becker
2,886,262 A 5/1959 Fletcher
2,986,344 A 5/1961 Knight
2,998,199 A 8/1961 Miscovich
3,010,519 A 11/1961 Gillespie
3,106,247 A 10/1963 Lacks et al.
3,114,392 A 12/1963 Harper
3,575,351 A 4/1971 Warren
3,583,637 A 6/1971 Miscovich
3,599,722 A 8/1971 Davidson et al.
2,612,408 A 10/1971 Holleman
3,612,408 A 10/1971 Holleman
3,675,721 A 7/1972 Davidson et al.
3,678,022 A 7/1972 Bozik et al.
3,762,478 A 10/1973 Cummins ..... A62C 27/00 169/24
3,770,062 A 11/1973 Riggs ..... A62C 31/24 169/24
3,786,869 A 1/1974 McLoughlin
3,786,969 A 1/1974 Kelly
3,836,084 A 9/1974 Luke
3,840,074 A 10/1974 Clark ..... A62C 31/24 169/24
3,931,930 A 1/1976 Waldrum
4,007,793 A 2/1977 Hux et al. ..... A62C 31/24 169/25
4,354,522 A 10/1982 Bormioli
4,392,618 A 7/1983 Evans et al.
4,506,738 A 3/1985 Evans et al.
4,515,311 A 5/1985 Takata
4,535,846 A 8/1985 Gagliardo et al.
4,607,702 A 8/1986 Miller
4,674,686 A 6/1987 Trapp
4,679,732 A 7/1987 Woodward
4,679,734 A 7/1987 Mommsen et al.
4,697,742 A 10/1987 Schnipke
4,723,713 A 2/1988 Dahlquist
4,776,403 A 10/1988 Lejosne
4,793,557 A 12/1988 Marchese et al.
4,875,526 A 10/1989 Latino et al.
4,949,794 A 8/1990 Petit et al.
5,007,585 A 4/1991 Kubacak et al.
5,249,632 A 10/1993 Sparling et al. ..... B05B 15/067 169/52
5,301,756 A 4/1994 Relyea et al.
5,425,505 A 6/1995 Jones
5,593,092 A 1/1997 McMillan et al.
5,782,504 A 7/1998 Chauncey
5,839,664 A 11/1998 Relyea
5,848,444 A 12/1998 Christopherson
5,860,479 A 1/1999 LaFollette
5,997,047 A 12/1999 Pimentel et al.
6,109,360 A 8/2000 Mandzukic et al.
6,113,343 A 9/2000 Goldenberg et al.
6,305,620 B1 10/2001 Marchese
6,305,621 B1 10/2001 Kolacz et al.
6,354,320 B1 3/2002 Kolacz et al.
6,402,048 B1 * 6/2002 Collins ..... B05B 3/14 239/210
6,439,478 B1 8/2002 King et al.
D479,314 S 9/2003 Trapp
6,655,613 B1 12/2003 Brown
6,745,957 B2 6/2004 Parey
6,786,426 B1 9/2004 Trapp
6,811,188 B2 * 11/2004 Haviland ..... 285/272
6,814,150 B2 11/2004 Clauss
6,994,282 B2 * 2/2006 Trapp et al. ..... 239/587.2
7,066,411 B2 6/2006 Male et al.
7,137,578 B2 11/2006 Steingass et al.
7,147,062 B2 12/2006 Kolacz et al.
7,191,964 B2 * 3/2007 Trapp ..... 239/587.2
7,243,864 B2 * 7/2007 Trapp et al. ..... 239/587.2
7,337,808 B2 3/2008 Shamir et al.
RE40,441 E 7/2008 Kolacz et al.
7,644,777 B2 1/2010 Combs et al.
7,802,630 B2 9/2010 Combs et al.
8,245,790 B2 8/2012 Lozier
8,606,373 B2 12/2013 Lozier et al.
8,827,189 B2 9/2014 Vanagosoom
9,223,265 B2 12/2015 Itoh et al.
9,675,826 B2 6/2017 Uhler
2003/0077110 A1 4/2003 Knowles
2004/0051312 A1 3/2004 Haviland
2004/0089735 A1 * 5/2004 Drechsel ..... B05B 3/14 239/195
2004/0216902 A1 * 11/2004 Trapp et al. ..... A62C 31/24 169/52
2005/0145727 A1 7/2005 Steingass et al.
2005/0167122 A1 * 8/2005 Trapp ..... A62C 31/24 169/52
2006/0091241 A1 5/2006 Trapp et al.
2006/0102756 A1 5/2006 Calvin et al.
2006/0231648 A1 10/2006 Male et al.
2008/0060706 A1 3/2008 Combs
2008/0061172 A1 3/2008 Trapp et al.
2009/0000795 A1 1/2009 Combs et al.
2009/0008105 A1 1/2009 Price et al.
2009/0101368 A1 4/2009 Lozier
2009/0107687 A1 4/2009 Combs et al.
2009/0226243 A1 9/2009 Krywitsky
2009/0277656 A1 11/2009 Combs
2009/0321091 A1 12/2009 Trapp et al.
2010/0147978 A1 6/2010 Vanagosoom
2010/0274397 A1 * 10/2010 Lozier et al. ..... A62C 37/00 700/283
2011/0017477 A1 1/2011 Combs
2011/0162718 A1 7/2011 Uhler
2011/0253397 A1 10/2011 Combs et al.
2012/0305273 A1 12/2012 Lozier
2013/0119167 A1 5/2013 Trapp et al.
2014/0048153 A1 2/2014 Prahl
2017/0095682 A1 4/2017 Combs

FOREIGN PATENT DOCUMENTS

DE 1952689 A1 5/1971
DE 29600355 U1 5/1997

(56) References Cited

FOREIGN PATENT DOCUMENTS

| | | | |
|---|---|---|---|
| GB | 485161 | A | 5/1938 |
| JP | 2007021988 | A | 1/2007 |
| WO | 2014007993 | A1 | 1/2014 |

OTHER PUBLICATIONS

Helitactics Operating and Maintenance Manual, dated Aug. 1995.
Helitactics Helicopter Deployable Forest Fire Suppression System, Equipment Evaluation Report, Jun./Jul. 1994.

* cited by examiner

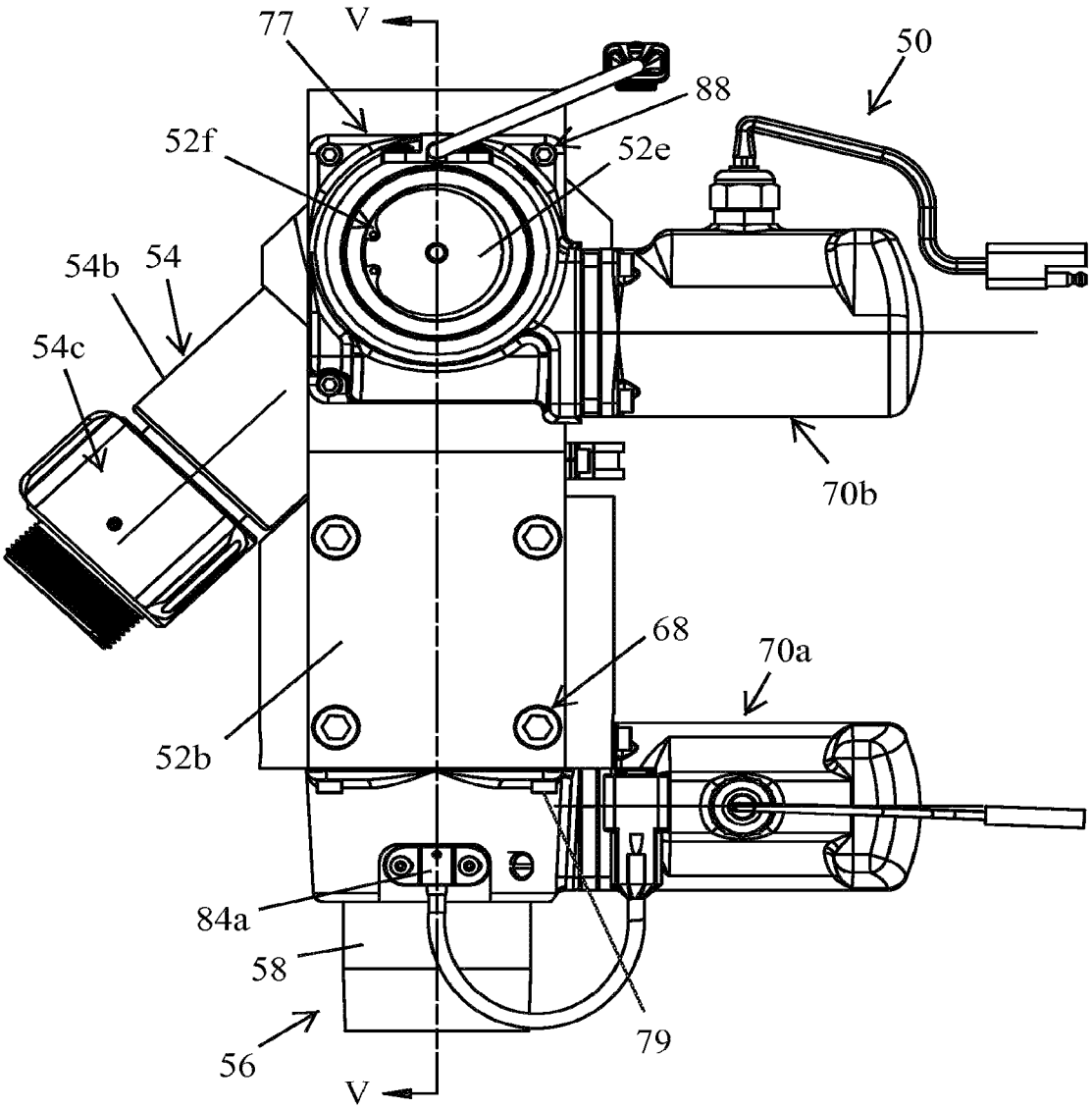
FIG. 3
AMENDED

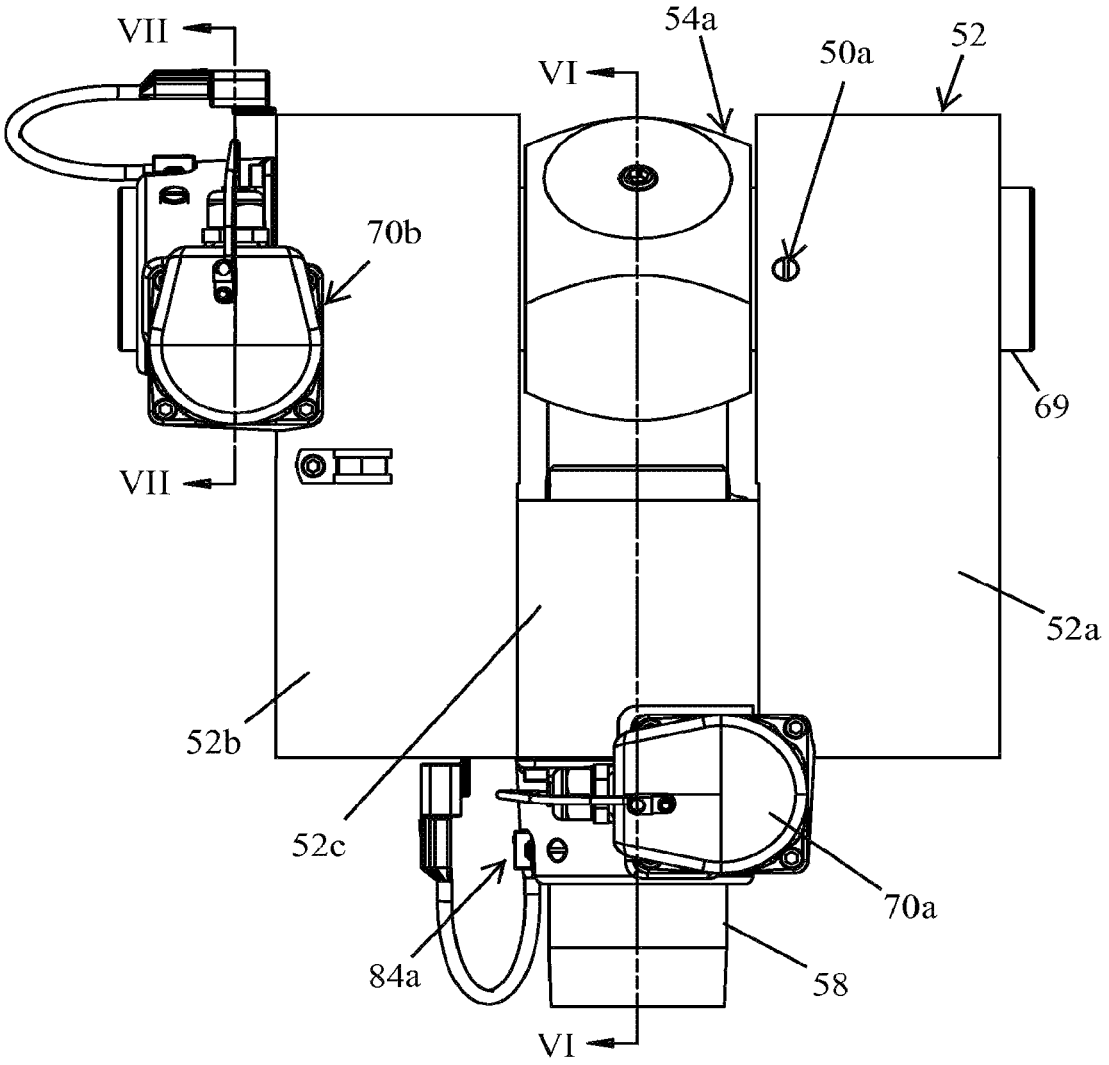
FIG. 4
AMENDED

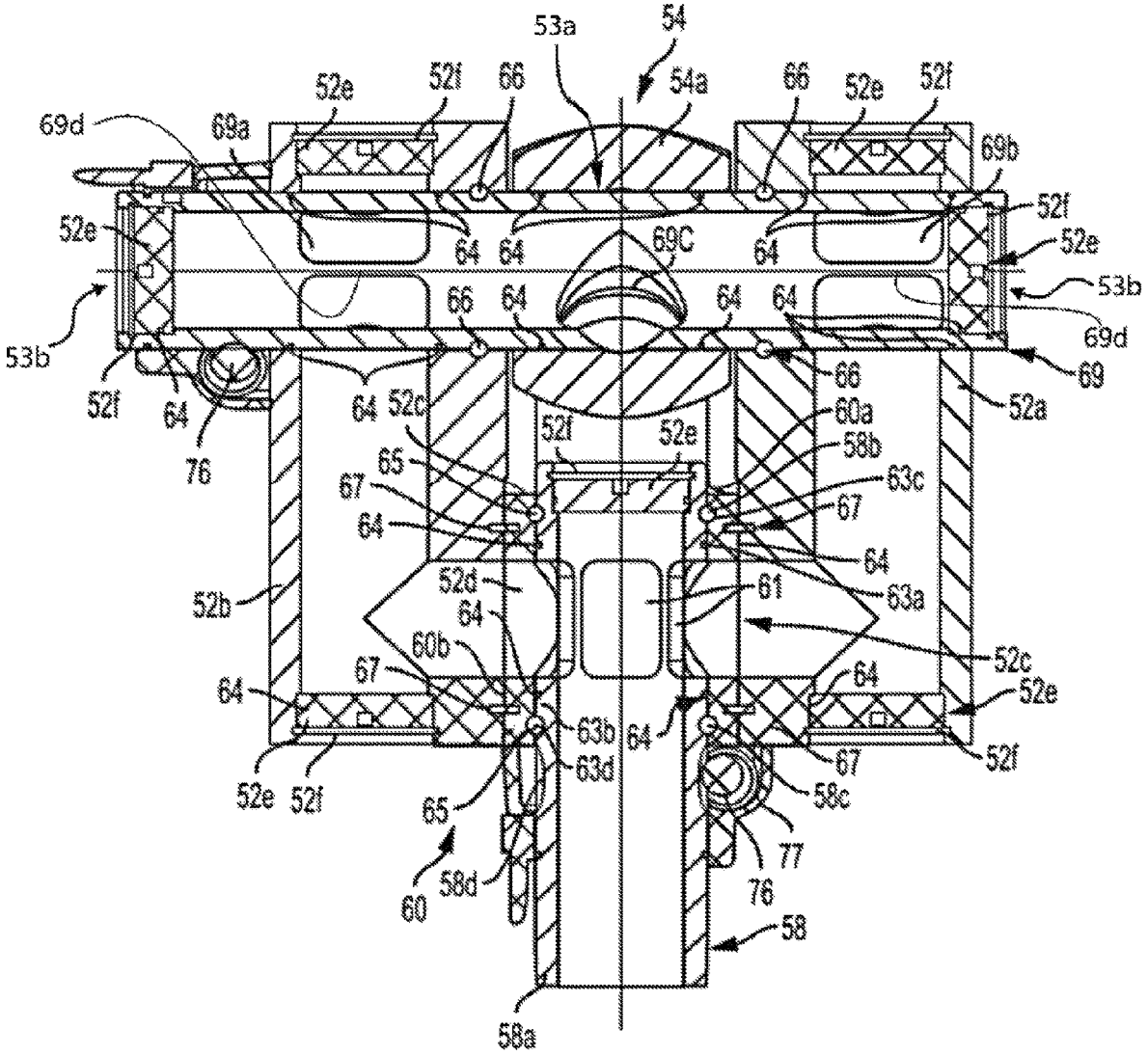
FIG. 5
AMENDED

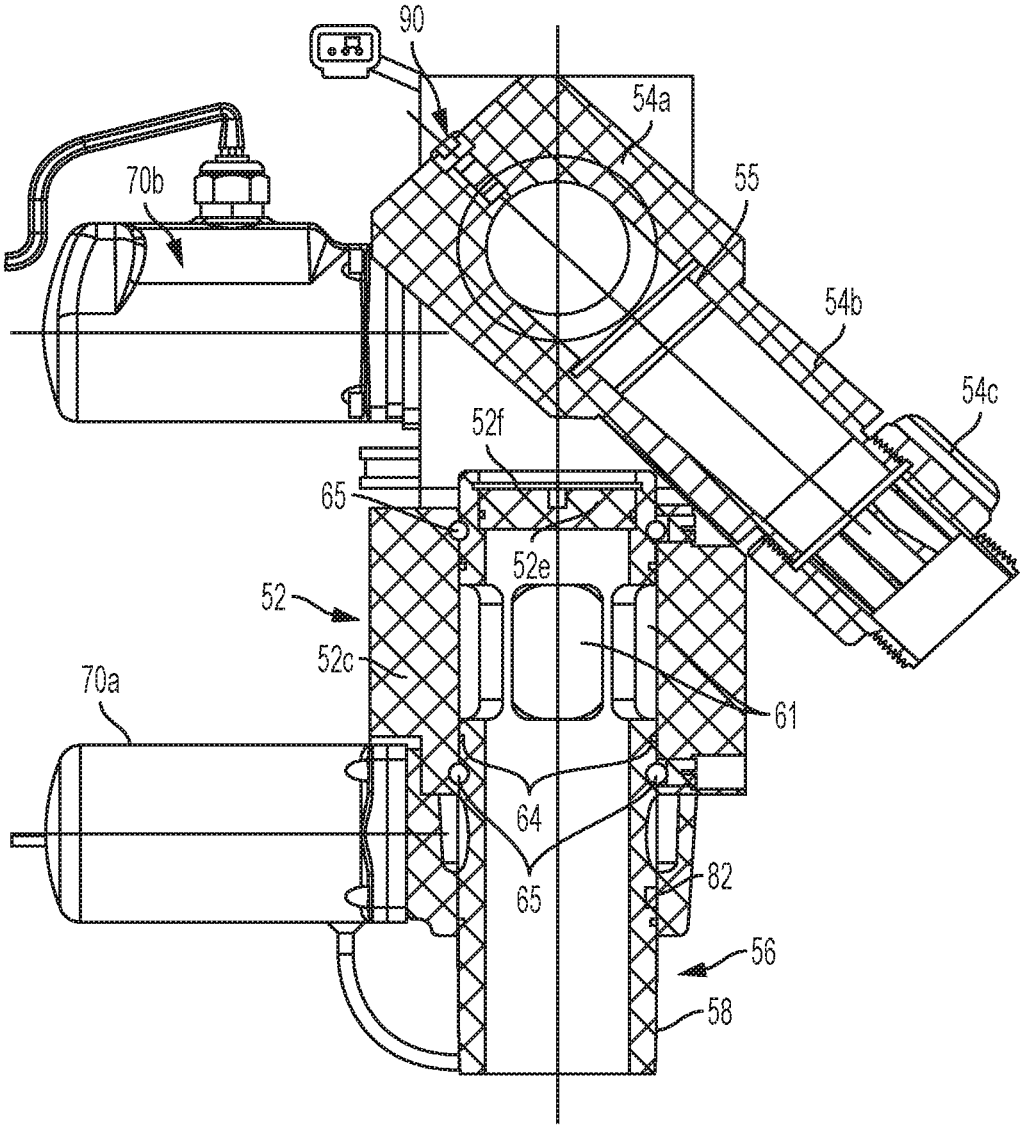
FIG. 6
AMENDED

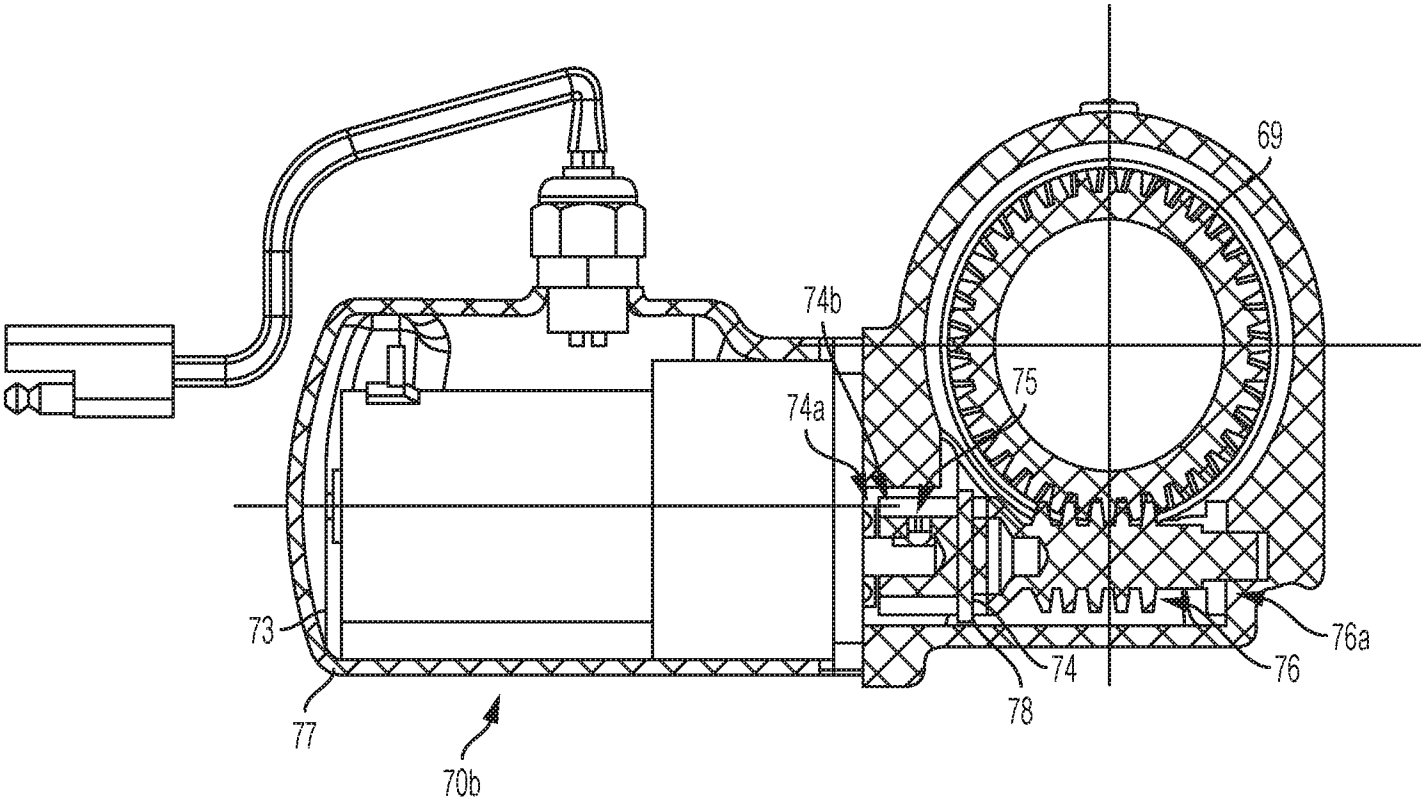
FIG. 7
AMENDED

FIRE-FIGHTING MONITOR WITH REMOTE CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a Continuation of U.S. patent application entitled FIRE-FIGHTING MONITOR WITH REMOTE CONTROL, Ser. No. 12/474,227, filed May 28, 2009, which is a Continuation of U.S. patent application entitled HIGH PRESSURE MONITOR, Ser. No. 11/519,627, filed on Sep. 12, 2006 (now abandoned)[, which is a non-provisional patent application based on U.S. Provisional Application Ser. No. 60/715,627 filed Sep. 9, 2005 entitled HIGH PRESSURE MONITOR]; and U.S. patent application Ser. No. 11/519,627 is a Continuation-in-Part of U.S. patent application entitled FIRE-FIGHTING MONITOR WITH REMOTE CONTROL, Ser. No. 10/984,047, filed Nov. 9, 2004, granted Mar. 20, 2007 as U.S. Pat. No. 7,191,964; and U.S. patent application Ser. No. 11/519,627 is also a Continuation-in-Part of U.S. patent application entitled RADIO CONTROLLED LIQUID MONITOR, Ser. No. 11/270,952, filed Nov. 11, 2005, granted Jul. 17, 2007 as U.S. Pat. No. 7,243,864; and U.S. patent application Ser. No. 10/984,047 is a Continuation-in-Part of U.S. patent application entitled RADIO CONTROLLED LIQUID MONITOR, Ser. No. 10/405,372, filed Apr. 2, 2003, granted Feb. 7, 2006 as U.S. Pat. No. 6,994,282; and Application Ser. No. 11/270,952 is a Continuation of U.S. patent application entitled RADIO CONTROLLED LIQUID MONITOR, Ser. No. 10/405,372, filed Apr. 2, 2003, granted [Jul. 17, 2007] *Feb. 7, 2006* as U.S. Pat. No. 6,994,282, the entire disclosures of all of the patents and patent applications referenced in this Cross [Section] *Reference* to Related Applications are hereby explicitly incorporated by reference herein.

TECHNICAL FIELD AND BACKGROUND OF THE INVENTION

The present invention generally relates to a high pressure monitor and, more specifically, for a high pressure monitor for use in a high pressure foam system.

SUMMARY

The present invention provides a monitor that is suitable for high pressure applications.

In one form of the invention, a high pressure monitor includes an outlet body and first and second bodies, with the outlet body mounted between the first and second bodies. The outlet body has a transverse passage, which extends through the body to form two inlets, and a second passage in communication with the transverse passage, which extends through the outlet body to form an outlet. Each of the first and second bodies has a transverse passage, which are in fluid communication with the inlets of the outlet body.

First and second swivel joints are provided between the outlet body and the first body and between the outlet body and the second body, respectively. Each of the swivel joints comprises a pressure balanced hydraulic fitting with seals and bearings, wherein the seals and bearing are oriented to reduce the axial pressure on the bearings from fluid flowing through the monitor.

In one aspect, the outlet body comprises a transverse tubular member mounted between the first and second bodies. The transverse tubular member has a passage, which forms the transverse passage of the outlet body and is in communication with the second passage of the outlet body. Further, the transverse tubular member is mounted in the first and second bodies by the first and second swivel joints.

In a further aspect, the high pressure monitor further includes an intermediate body with an inlet and a transverse passage, which is in communication with the inlet of the intermediate body. The transverse passage of the intermediate body is in fluid communication with the transverse passages of the first and second bodies.

According to a further aspect, the high pressure monitor also includes an inlet body. The inlet body has a transverse passage, which is in fluid communication with the transverse passages of the first and second bodies and forms the inlet of the monitor. The inlet body also has a swivel joint between the inlet body and the intermediate body wherein the inlet body is rotatable within the intermediate body. For example, the swivel joint at the inlet body and the intermediate body may comprise pressure balanced hydraulic fittings, such as seals and bearings.

In yet another aspect, the transverse passages of the first and second bodies are configured to provide an expanded volume for fluid flowing into the monitor wherein the pressure at the swivel joint between the inlet body and the intermediate body is reduced from the pressure at the inlet of inlet body.

In another aspect, the transverse passages in the first and second bodies and the intermediate body are configured to balance the pressure at the swivel joint between the inlet body and the intermediate body.

According to a further aspect, the traverse passages of the first and second bodies and the transverse member are configured to maintain the reduced pressure of the fluid flowing through the monitor wherein the pressure at the swivel joints between the outlet body and the first and second bodies is reduced from the outlet pressure of the fluid flowing from the outlet of the monitor.

In addition, the transverse passages of the first and second bodies and of the transverse member are configured and arranged to balance the pressure at the swivel joints between the outlet body and the first and second bodies.

In yet other aspects, the monitor further optionally includes a driver for pivoting the outlet body. Similarly, the monitor may include a driver for rotating the intermediate body about the inlet body.

According to another form of the invention, a high pressure monitor includes an outlet body, first and second bodies, with the outlet body rotatably mounted between the first and second bodies, an intermediate body, and an inlet body. Each of the first and second bodies has a transverse passage, which are in fluid communication with the inlets of the outlet body. The inlet body has a transverse passage that is in fluid communication with the transverse passages of the first and second bodies through the intermediate body and forms the inlet of the monitor. The inlet body also has a swivel joint between the inlet body and the intermediate body wherein the intermediate body is rotatable about the inlet body. In addition, the inlet body and the intermediate body include openings to provide fluid communication between the inlet body and the passages of the first and second bodies, which are arranged to direct the flow of fluid radially outward from the inlet body in a direction perpendicular to the inlet flow of fluid into the inlet body.

In one aspect, the high pressure monitor includes a first swivel joint between the outlet body and the first body and a second swivel joint between the outlet body and the second body.

In a further aspect, the outlet body includes a transverse tubular member that is mounted between the first and second bodies and has a passage, which forms the transverse passage of the outlet body. The passage of the tubular member is in communication with the second passage of the outlet body. In addition, the transverse tubular member is mounted in the first and second bodies by the first and second swivel joints.

In another aspect, the swivel joint at the inlet body and the intermediate body comprises pressure balanced hydraulic fittings.

According to other aspects, the transverse passages of the first and second bodies are configured to provide an expanded volume for fluid flowing into the monitor wherein the pressure at the swivel joint between the inlet body and the intermediate body is reduced from the pressure at the inlet of inlet body.

In another aspect, the traverse passages of the first and second bodies and the transverse member are configured to maintain the reduced pressure of the fluid flowing through the monitor wherein the pressure at the swivel joints between the outlet body and the first and second bodies is reduced from the outlet pressure of the fluid flowing from the outlet of the monitor.

In yet another aspect, the transverse passages of the first and second bodies and of the transverse member are configured and arranged to balance the pressure at the swivel joints between the outlet body and the first and second bodies.

Accordingly, the present invention provides a monitor that is particularly suitable for high pressure applications.

These and other objects, advantages, purposes, and features of the invention will become more apparent from the study of the following description taken in conjunction with the drawings.

DETAILED DESCRIPTION OF THE DRAWINGS

FIG. 3 is a right side elevation view of the high pressure monitor of FIG. 1;

FIG. 4 is a rear elevation view of the high pressure monitor of FIG. 1;

FIG. 5 is a cross-section view taken along line V-V of FIG. 3;

FIG. 6 is a cross-section view taken along line VI-VI of FIG. 4;

FIG. 7 is a cross-section view taken along line VII-VII of FIG. 4; and

DETAILED DESCRIPTION OF THE PREFERRED EMBODIMENTS

Figure 1:
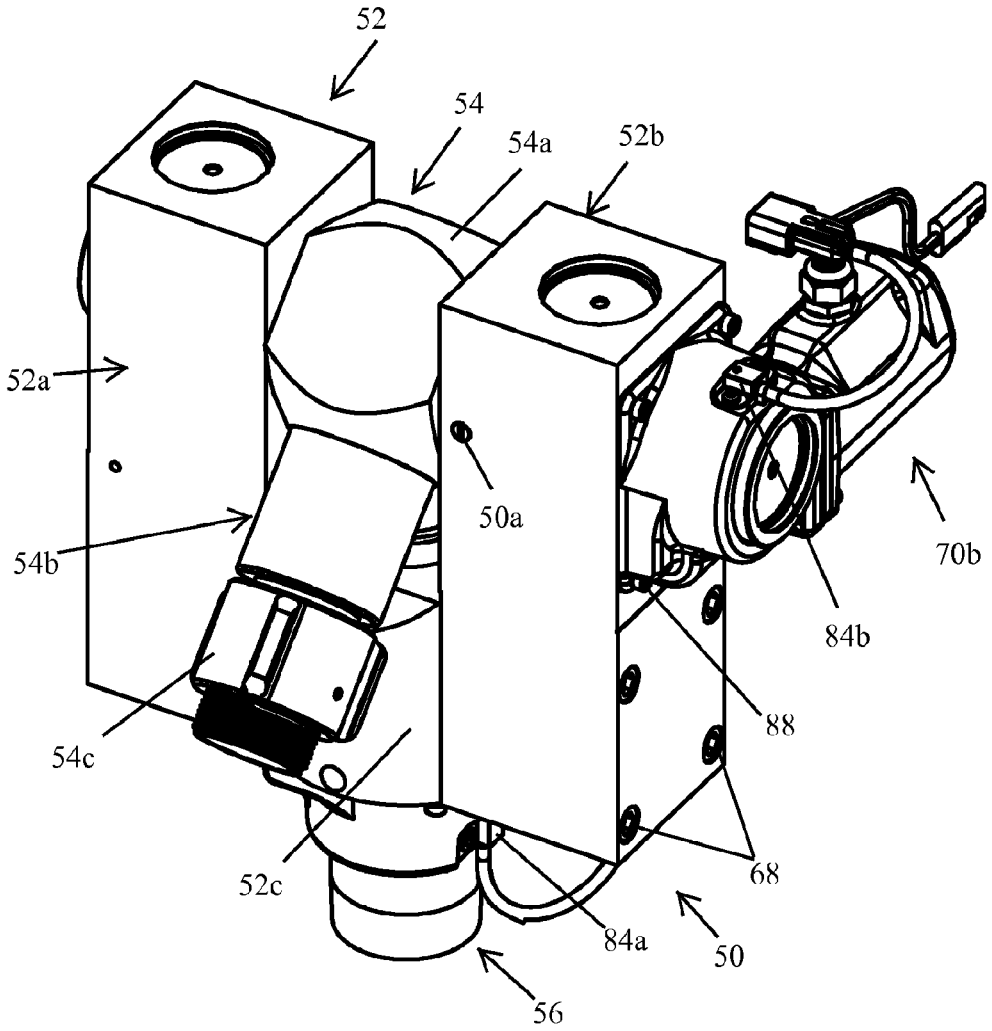
FIG. 1 is a perspective view of the high pressure monitor of the present invention.
Figure 2:
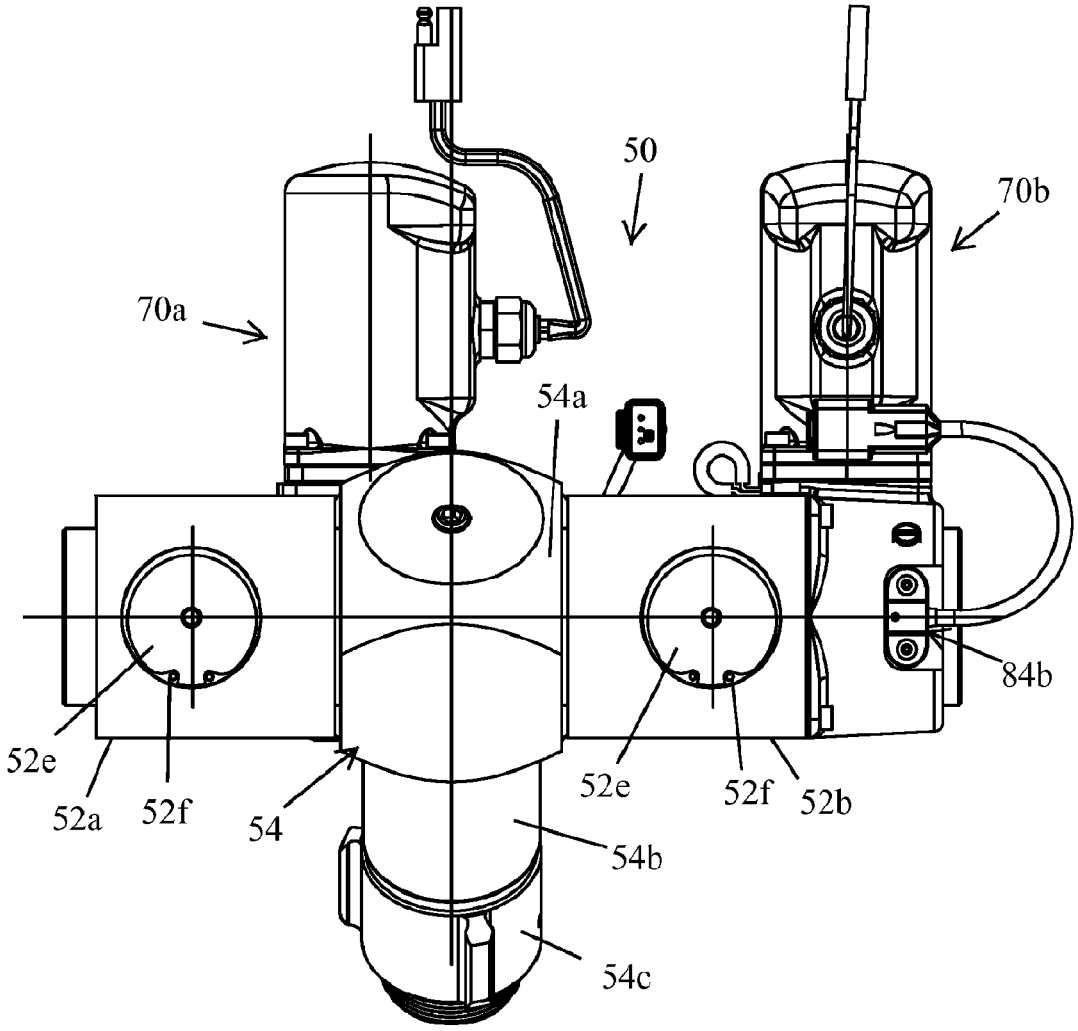
FIG. 2 is a top plan view of the high pressure monitor of FIG. 1.

Referring to FIG. 1, the numeral 50 designates a monitor of the present invention. As will be more fully described below, monitor 50 is configured and arranged so that it can be used as a high pressure monitor and can handle a high flow rate capacity, for example flow rates of up to 300 gal/min at a high pressure, for example at an inlet pressure of up to 1500 lbs/in$^2$. Further, monitor 50 is particularly suitable for use in a high pressure foam system.

As best seen in FIG. 1, monitor 50 includes a housing 52, an outlet assembly or body 54, and an inlet assembly 56. Housing 52 is formed from two generally block-shaped bodies 52a, 52b that form an outer housing and which are interconnected by an intermediate body 52c, which forms part of the inlet assembly 56, and by outlet assembly 54. Housing 52, outlet assembly 54, and inlet assembly 56 are optionally formed from wrought aluminum and are further optionally assembled together using fasteners, such as bolts, such that monitor 50 may comprise a bolted modular monitor.

Referring to FIG. 5, inlet assembly 56 includes an inner inlet body 58 that provides a vertical fluid flow path, as viewed in FIG. 5, and an inlet connection to an external fluid supply, such as a pipe or tank. Inlet body 58 is rotationally mounted in intermediate body 52c by a swivel joint 60, which includes inner and outer halves 60a, 60b. Inner [halve] *half* 60a of joint 60 is located inwardly of housing 52 in the inner or upper portion of intermediate body 52c. And, outer [halve] *half* 60b of joint 60 is located in the outer or lower portion of intermediate body 52c. Body 58 includes a plurality of openings 61 in its side wall 58a to direct the flow of fluid into the monitor in a radially outward direction from body 58. Similarly, intermediate body 52c includes a passage which forms two outlet ports 52d located 180° apart and oriented at right angles to the swivel joint axis. These ports exit through and are perpendicular to rectangular faces of bodies 52a, 52b so that fluid flowing from inlet assembly 56 into housing 52 flows radially outward in a direction perpendicular to the flow of fluid through the [transverse] passage of body 58. Further, the height of the openings 61 is commensurate with the height of the [passageway] *passageways* in intermediate body 52c. As a result, the fluid flows in a direction perpendicular to the interface between the intermediate body 52c and inner and outer halves 60a, 60b of swivel joint 60. Consequently, the configuration is such that swivel joint 60 forms a pressure balanced swivel joint.

Inner half 60a of swivel joint 60 includes annular grooves 63a and 63b formed on body 58 for two O-ring seals 64, and two annular grooves 63c and 63d formed on intermediate body 52c, which align with annular grooves 58b, 58c formed on the outer surface of body 58 to serve as ball bearing races and receive bearings 65. In this manner, swivel joint 60 allows for left-right rotation of the firefighting monitor about the inlet body 58 and the fluid inlet connection (as seen from FIG. 5). The annular interface or clearance between inlet body 58 and intermediate body 52c is therefore sealed by O-ring seals 64, which are located in the annular grooves formed on their respective facing surfaces. Further, O-ring seals 64 seal against the pressure of the fluid flowing through the monitor. The pressure balance of swivel joint 60 is therefore accomplished by the placement of sealing members 64 relative to the pressure ports such that no net axial force due to static pressure is applied to the ball bearings 65.

As noted above, intermediate body 52c includes internal ball bearing races 63c and 63d that align with bearing races 58b and 58c provided in inlet body 58. Bodies 58 and 52c are assembled and rotatably mounted together by the insertion of Torlon® bearing balls 65 into these races (FIG. 5), which are retained in the races by blocks 52a and 52b and a set screw 50a (FIG. 1). In addition, the faces of body 52c that interface with bodies 52a, 52b include four tapped mounting holes each, which align with corresponding holes in the two block-shaped bodies 52a, 52b of housing 52. Further, bodies 52a, 52b are aligned to the intermediate body 52c with pins 67 (FIG. 5), and are clamped to the intermediate body 52c with bolts 68 (FIG. 3). The interfaces between intermediate body 52c and bodies 52a, 52b are also sealed with O-rings 64 (FIG. 5) which are located on grooves formed on their respective facing surfaces.

Bodies 52a, 52b each include passageways that are in communication with the passageways in intermediate or outer inlet body 52c and serve to receive the water discharged horizontally from the discharge ports of the intermediate body 52c and redirect the flow upward to the outlet assembly 54 through an inner discharge body 69. Further, the passageways of bodies 52a, 52b are optionally larger than the passageways or passages of intermediate body 52c or inlet body 58 to thereby provide expanded volumes to reduce the pressure at the swivel joint between the inlet assembly 56 and housing 52. Similarly, as will be described below, bodies 52a, 52b and transverse member 69 are configured to maintain the reduced pressure of the fluid flowing through the monitor wherein the pressure at the swivel joints between the outlet body and the first and second bodies is reduced from the outlet pressure of the fluid flowing from the outlet of the monitor.

Inner discharge body 69 is a tubular transverse member *having a middle portion 53a and end portions 53b* with a transverse passage with two sets of inlet ports 69a and 69b that align with the vertical passages of bodies 52a, 52b. *Each of the sets of inlet ports 69a and 69b may have at least a pair of adjacent ports circumferentially spaced from one another and separated by elements 69d extending from the middle portion 53a to the corresponding end portion 53b. The ports of the sets of inlet ports 69a and 69b may be circumferentially spaced from adjacent ports and separated by the elements 69d to ensure the passages in the bodies 52a and 52b may be fluidly coupled to the passage of the body 69 regardless of the orientation of the outlet assembly 54. More specifically, the elements 69d may be sized to not substantially cover the fluid passages of the bodies 52a and 52b regardless of the orientation of the discharge body 69. Further, in one non-exclusive embodiment there are four ports circumferentially spaced from one another at each of the sets of inlet ports 69a and 69b.* The passages in bodies 52a and 52b and in tubular member 69 are generally commensurate in size so as to maintain the reduced pressure of the fluid flowing through the monitor. Body 69 is rotatably supported in bodies 52a, 52b by bearings 66 that are located in raceways formed or provided in the outer surface of discharge body 69 and in the side walls of bodies 52a, 52b. These ball bearings allow a low friction swivel joint for rotation of body 69 about the horizontal axis as viewed in FIG. 5. As would be understood, rotation of body 69 about the horizontal axis serves to provide up-down motion of the outer discharge body 54a (FIG. 6) and discharge adapter 54b, which form outlet assembly 54. *Further, rotation of body 69 causes elements 69d to rotate therewith and may cause elements 69d to extend across vertical passages of bodies 52a and 52b. However, elements 69d are sized so they do not substantially fluidly block the vertical passages from the transverse passage of the body 69 as the elements 69d extend across the vertical passages.* The annular spaces between inner discharge body 69 and bodies 52a, 52b are also sealed with seals, such as O-rings 64. Similar to left-right swivel joint 60, these O-rings are positioned to accomplish a pressure balance such that no net axial force due to static pressure is applied to the ball bearings.

As noted, in the illustrated embodiment, bodies 52a, 52b are formed from block-shaped members. Further, each body 52a, 52b is formed from a tubular block-shaped member with open ends that are closed and sealed by plugs 52e and seals, such as O-rings 64, which forms the vertical flow passages (as viewed in FIG. 5) of bodies 52a, 52b. The plugs 52e are retained within the bodies 52a, 52b by retaining rings 54f. Body 69 is similarly formed by a tubular member with open ends that are closed and sealed by plugs 52e and seals 64, which forms a horizontal flow passage. Plugs 52e are similarly retained within the inner discharge body 69 by retaining rings 52f. Inner discharge body 69 also includes a discharge port [69c] *69C* that is located midway between the ball bearing races for directing fluid to outer discharge body 54a.

Discharge outer body 54a contains a through circular internal passage, which allows it to be slip fitted onto inner discharge body 69, and a discharge port which is aligned with the discharge port *69C* of inner discharge body 69. Axial positioning of outer discharge body 54a to inner discharge body 69, as well as alignment of discharge ports of these two parts is accomplished by installation of screw [89] *90* (FIG. 6) into a tapped hole in outer discharge body 54a and into a clearance hole in inner discharge body 69. The head of screw [89] *90* is sealed against leakage by O-ring [90a] (*not shown*). The discharge port of outer discharge body 54a contains threads 55 to allow connection with mating threads of discharge adapter 54b. This threaded joint is sealed against leakage by O-ring [55a] (*not shown*). Similarly, adapter 54b includes threads for mounting a stream shaper 54c [and] *or* nozzle *92* to outlet assembly 54. As would be understood, the outlet pressure at the outlet body 54a and adapter 54b is increased over the pressure in the monitor due to the [reduce] *reduced* volume of the outlet body and adapter as compared to the volume of the passage of tubular member 69.

In addition to providing an inlet for monitor 50, body 58 forms a base about which monitor housing 52 can be rotated to adjust the angular orientation of the outlet of monitor 50 about the vertical axis. Monitor housing 52 is rotated about body 58 by a first driver 70a (FIG. 3). As best seen in FIG. 6, driver 70a is mounted to housing 52 and drives body 58 to rotate housing 52 about body 58, which is secured to the inlet connection. In the illustrated embodiment, body 58 includes gears in the form of worm gear teeth 58d that are machined into the outer cylindrical surface of cylindrical wall 58a below the lower ball bearing race (63d)(FIG. 5).

To drive the outlet, monitor 50 includes a second driver 70b (FIGS. 1, 6), which has a similar construction to driver 70a. Driver 70b engages body 69, which projects through body 52b, to thereby rotate discharge body 69 about its longitudinal axis to thereby raise or lower discharge body 54a and the nozzle that is mounted to discharge body 54a.

As best seen in FIG. 7, driver 70b includes a [gear motor assembly] *motor* 73, a drive coupling 74, which is coupled to the output shaft of [gear motor assembly] *motor* 73 through a thrust bearing 74a and thrust washer 74b using setscrew 75, and a drive shaft 76, which is coupled to drive coupling 74, for driving the body 69 about the horizontal axis as viewed in FIG. 5. [Gear motor assembly] *Motor* 73, drive coupling 74 and drive shaft 76 are all supported by a case 77, with the positive drive coupling of drive coupling 74 to drive shaft 76 accomplished by a pin 78 which is held in place by a force fit into coupling 74. And, the end of drive shaft 76 supported and sealed in case 77 by a thrust bearing 76a and *an* O-ring seal [76b] (*not shown*). The outer ends of pin 78 slide into two slots located 180° apart in the coupling end of shaft 76.

Drive shaft 76 comprises a worm shaft, whose gear teeth mate with the gear teeth provided on body 69. Body 69 includes worm gear teeth machined into the outer cylindrical surface near the left end of the part as viewed in FIG. 5. Second driver 70b is mounted to vertical body 52b using cap screws 88 and optionally allows for remote control actuation of monitor up-down rotation.

Driver 70a similarly includes a [gear motor assembly] *motor* 73, a drive coupling 74, which is coupled to the output shaft of [gear motor assembly] *motor* 73 using setscrew 75, and a drive shaft 76, which is coupled to the drive coupling, for driving the body 58 about the vertical axis as viewed in FIG. 5. Drive shaft 76 of driver 70a also comprises a worm shaft, whose gear teeth mate with the gear teeth 58d on body 58. Driver 70a is mounted to housing 52 by worm case 77, which mounts to the undersides of intermediate body 52c and bodies 52a, 52b using cap screws 79 (FIG. [4] *3*) to position shaft 76 to engage the gear teeth on body 58. For further details of driver 70a, reference is made to driver 70b.

Each driver 70a, 70b further includes wiring and/or cables for coupling to an external power supply and controls to allow for remote control actuation of monitor left-right or up-down rotation, described below.

Travel limits for the left-right swivel joint *60* are established by the presence of magnets 82 (FIG. 6), which are mounted to body 58, and Hall sensor 84a (FIG. 1). In the illustrated embodiment, magnets 82 are mounted in recesses or holes within the outer cylindrical surface of inner inlet body 58. When a magnet [(82)] is moved with inlet body 58 to be within sensing range of sensor 84a, a control signal from sensor 84a to a microprocessor within control module 86 (FIG. 8) causes motor 73 to stop and inhibits further rotation of the motor in that direction.

Travel limits for the up-down swivel joint are also established by the presence of magnets [82] (*not shown*) provided, for example, in recesses or holes in the outer cylindrical surface of inner discharge body 69, along with a second Hall sensor 84b. When a magnet [(82)] is moved with inner [outlet] *discharge* body 69 to be within sensing range of second sensor 84b, a control signal from second sensor 84b to the microprocessor within control module 86 causes second motor 73 to stop and inhibits further rotation of the motor in that direction.

Figure 8:
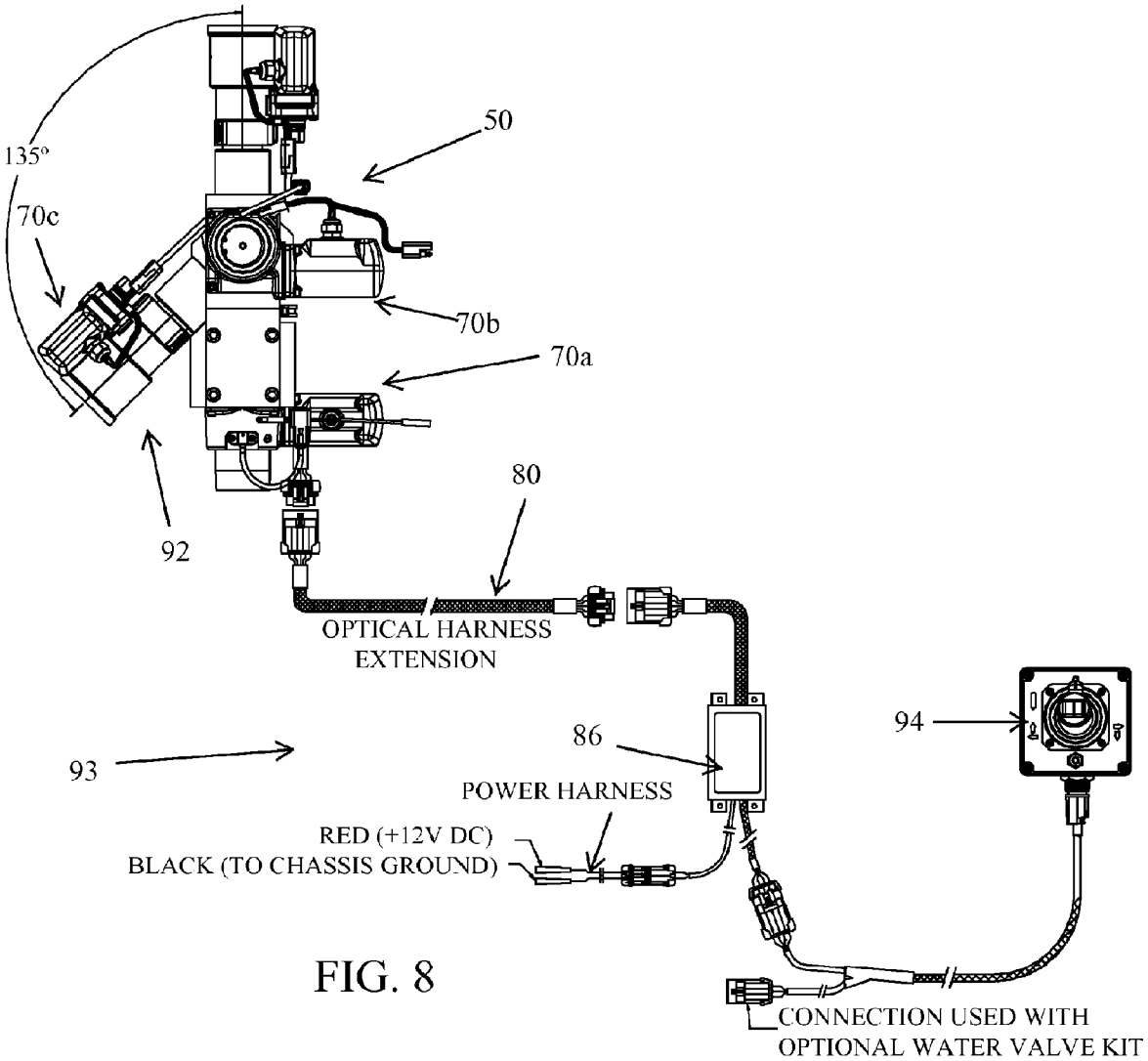
FIG. 8 is a schematic drawing of a monitor and nozzle system layout.

Referring to FIG. 8, discharge adapter 54b serves to provide a discharge flow passage and to properly position nozzle 92 relative to the monitor assembly. The discharge end of discharge adapter 54b has a male hose thread to mate with the attachment coupling of nozzle 92. Nozzle 92 optionally comprise a combination straight stream and fog nozzle with electrically controlled actuator 70c to allow remote adjustment of the stream pattern from wide spray to straight stream, and is calibrated to flow at high flow rates and high pressure, for example 300 gal/min at an inlet pressure of 1500 lbs/in$^2$. Actuator 70c is a commercial actuator.

As noted above, drivers 70a, 70b, and, further, actuator 70c may all be controlled by a control system 93. As best seen in FIG. 8, control system 93 includes a control module 86. Control module 86 is configured to provide remote control of the positioning of monitor 50 about the vertical axis and over the vertical position of the outlet assembly, as well as control over the stream of fluid from nozzle 92 via actuator 70c. In the illustrated embodiment, control module 86 is in communication with drivers 70a, 70b and actuator 70c through wiring and cables, which are optionally enclosed in a harness 80, though it should be understood that RF (*radio frequency*) transmission may be used for transmitting and receiving control signals. In addition, control system 93 may include a user actuatable device, such as a joystick 94, to provide manual override over control module 86.

Additional monitor control capability could be achieved by the addition of an optical or magnetic encoder to one or both of the [gear motor assemblies] *motors*. Signal pulses sent from an encoder to a properly programmed control processor could allow for automatic oscillation of the left-right nozzle sweep within a chosen arc. User inputs to initiate monitor and nozzle motion may be accomplished through joystick assembly 94, which is coupled or in communication with control module 86. Further, RF control of the monitor may be achieved using a similar RF control system described in [copending applications. The present application is a continuation-in-part of copending application] *commonly owned applications* entitled RADIO CONTROLLED LIQUID MONITOR, Ser. No. 10/405,372, filed Apr. 2, 2003, *now U.S. Pat. No. 6,994,282,* and FIRE-FIGHTING MONITOR WITH REMOTE CONTROL, Ser. No. 10/984,047, filed Nov. 9, 2004, *now U.S. Pat. No. 7,191,964,* which are incorporated herein in their entireties.

While one form of the invention has been shown and described, other forms will now be apparent to those skilled in the art. Therefore, it will be understood that the embodiment shown in the drawings and described above is merely for illustrative purposes, and is not intended to limit the scope of the invention which is defined by the claims which follow as interpreted under the principles of patent law including the doctrine of equivalents.

The embodiments of the invention in which an exclusive property right or privilege is claimed are defined as follows:

1. A fire-fighting monitor for directing the flow of fluid from a fluid source, said monitor comprising: a cylindrical pipe section adapted to mount said monitor to a fluid source; a monitor body having an inlet and an outlet, said inlet mounted on and supported by said cylindrical pipe section and for receiving fluid through said pipe section, said outlet in fluid communication with said inlet for discharging fluid from said monitor body; a rotatable connection between said inlet and said pipe section, said rotatable connection permitting said inlet to rotate about a first axis over a range of motion about said pipe section; a drive mechanism mounted to one of said pipe section and said monitor body and drivingly engaging the other of said pipe section and said monitor body for rotating said inlet about said pipe section about said first axis; and a control capable of receiving control signal commands, said control operably connected to said drive mechanism so that said control may provide control signals to said drive mechanism in response to receipt of radio control signal commands to control the rotation of said monitor body about said pipe section, and said control further adapted to cause said monitor body to rotate back and forth in oscillation between predetermined limits established electronically by said control.

2. The fire-fighting monitor according to claim 1, further comprising a remote transmitter apparatus, said remote transmitter apparatus including said transmitter, said remote transmitter apparatus being adapted to allow a user to adjust said predetermined limits.

[3. The fire-fighting monitor according to claim 2, wherein said control further establishes maximum predetermined limits.]

[4. The fire-fighting monitor according to claim 3, wherein said maximum predetermined limits are only adjustable using said control and not by said remote transmitter apparatus.]

[5. The fire-fighting monitor according to claim 2, wherein said rotatable connection permits said inlet to rotate about said first axis over a range of motion extending at least 360 degrees about said pipe section.]

[6. The fire-fighting monitor according to claim 5, wherein said predetermined limits may be adjusted at the control.]

[7. The fire-fighting monitor according to claim 6, wherein said predetermined limits may be adjusted between any two positions in said range of motion.]

[8. The fire-fighting monitor according to claim 1, further comprising a housing mounted to said monitor body, said control being mounted in said housing.]

9. The fire-fighting monitor according to claim 1, wherein said monitor body comprises an inlet pipe Section and an outlet pipe section rotatably mounted relative to said inlet pipe section about a second pivot axis, and said outlet pipe section including said outlet.

10. The fire-fighting monitor according to claim 9, further comprising a second drive mechanism for rotating said outlet pipe section about said second pivot axis.

[11. The fire-fighting monitor according to claim 1, wherein said cylindrical pipe section includes an integral mounting flange extending radially outwardly from said cylindrical pipe section for mounting said monitor to a fire fighting fluid supply.]

*12. The fire-fighting monitor of claim 1, wherein said discharge section comprises a stream shaper.*

*13. The fire-fighting monitor of claim 1, wherein said drive mechanism comprises a worm shaft intermeshing with worm gear teeth.*

*14. The fire-fighting monitor of claim 13, wherein the drive mechanism further comprises a motor drivingly connected to the worm shaft.*

*15. The fire-fighting monitor of claim 1, wherein the plurality of ports are spaced apart to enable fluid flow during rotation of the discharge section with respect to the housing.*

*16. The fire-fighting monitor of claim 1, wherein the rotatable connection between the inlet section and the housing includes a pressure balanced swivel joint.*

*17. The fire-fighting monitor of claim 1, wherein the plurality of ports include four ports.*

*18. The fire-fighting monitor of claim 1, wherein the pair of the plurality of ports are located adjacent to each other.*

*19. The fire-fighting monitor of claim 1, wherein the pair of the plurality of ports are separated by an element of the discharge section, the element being located circumferentially between the pair of the plurality of ports.*

*20. The fire-fighting monitor of claim 19, wherein the element is rotatable to extend across a flow passage in the housing.*

*21. The fire-fighting monitor of claim 19, wherein the element connects the end portion of the discharge section and the middle portion of the discharge section.*

*22. A fire-fighting monitor for directing a flow of fluid from a fluid source, said monitor comprising: an inlet section adapted to mount said monitor to the fluid source; a housing having an inlet and an outlet, said inlet mounted on and supported by said inlet section and for receiving fluid through said inlet section, said outlet in fluid communication with said inlet and a discharge section for discharging fluid from said monitor; a rotatable connection between said housing and said inlet section, said rotatable connection permitting said housing to rotate about a first axis over a range of motion about said inlet section, said discharge section including a plurality of ports configured to rotate relative to the housing and enable fluid flow along a path from the housing to the discharge section, a pair of the plurality of ports being circumferentially spaced in the discharge section; a drive mechanism mounted to the monitor and rotating the housing relative to the inlet section about said first axis; and a control capable of receiving control signal commands, said control operably connected to said drive mechanism in order to provide control signals to said drive mechanism in response to receipt of control signal commands to control a rotation of said housing about said inlet section, and said control further adapted to cause said housing to rotate back and forth in oscillation between predetermined limits.*

*23. The fire-fighting monitor of claim 22, wherein the pair of the plurality of ports are located between a middle portion and an end portion of the discharge section.*

*24. The fire-fighting monitor of claim 22, wherein the discharge section includes an element located circumferentially between the pair of the plurality of ports.*

*25. The fire-fighting monitor of claim 24, wherein the element connects an end portion of the discharge section and a middle portion of the discharge section.*

*26. A fire-fighting monitor for directing a flow of fluid from a fluid source, said monitor comprising: an inlet section adapted to mount said monitor to the fluid source; a housing having an inlet and an outlet, said inlet mounted on and supported by said inlet section and for receiving fluid through said inlet section, said outlet in fluid communication with said inlet and a discharge section for discharging fluid from said monitor; a rotatable connection between said housing and said inlet section, said rotatable connection permitting said housing to rotate about a first axis over a range of motion about said inlet section, said discharge section including a plurality of ports configured to rotate relative to the housing and enable fluid flow along a path from the housing to the discharge section, a pair of the plurality of ports being separated by an element of the discharge section, the element connecting a middle portion of the discharge section and an end portion of the discharge section; a drive mechanism mounted to the monitor and rotating the housing relative to the inlet section about said first axis; and a control capable of receiving control signal commands, said control operably connected to said drive mechanism in order to provide control signals to said drive mechanism in response to receipt of control signal commands to control a rotation of said housing about said inlet section, and said control further adapted to cause said housing to rotate back and forth in oscillation between predetermined limits.*

*27. The fire-fighting monitor of claim 26, wherein the element of the discharge section is rotatable to extend across a flow passage in the housing.*

*28. The fire-fighting monitor of claim 26, wherein the element is located circumferentially between the pair of the plurality of ports.*

*29. A fire-fighting monitor for directing a flow of fluid from a fluid source, said monitor comprising: an inlet section adapted to mount said monitor to the fluid source; a housing having an inlet and an outlet, said inlet mounted on and supported by said inlet section and for receiving fluid through said inlet section, said outlet in fluid communication with said inlet and a discharge section for discharging fluid from said monitor; a rotatable connection between said*

*housing and said inlet section, said rotatable connection permitting said housing to rotate about a first axis over a range of motion about said inlet section, said discharge section including a plurality of ports configured to rotate relative to the housing and enable fluid flow along a path from the housing to the discharge section, a pair of the plurality of ports being separated by an element of the discharge section, the element of the discharge section being rotatable to extend across a flow passage in the housing; a drive mechanism mounted to the monitor and rotating the housing relative to the inlet section about said first axis; and a control capable of receiving control signal commands, said control operably connected to said drive mechanism in order to provide control signals to said drive mechanism in response to receipt of control signal commands to control a rotation of said housing about said inlet section, and said control further adapted to cause said housing to rotate back and forth in oscillation between predetermined limits.*

*30. The fire-fighting monitor of claim 29, wherein the pair of the plurality of ports are located between an end portion of the discharge section and a middle portion of the discharge section.*

* * * * *